United States Patent
Ryder et al.

(10) Patent No.: US 10,489,747 B2
(45) Date of Patent: Nov. 26, 2019

(54) SYSTEM AND METHODS TO FACILITATE SOCIAL MEDIA

(75) Inventors: Scott Carter Ryder, Austin, TX (US); Adam David Weinroth, Austin, TX (US); Duane Kimbell Fields, Bastrop, TX (US)

(73) Assignee: LEAF GROUP LTD., Santa Monica, CA (US)

( * ) Notice: Subject to any disclaimer, the term of this patent is extended or adjusted under 35 U.S.C. 154(b) by 1634 days.

(21) Appl. No.: 12/245,613

(22) Filed: Oct. 3, 2008

(65) Prior Publication Data

US 2010/0088182 A1    Apr. 8, 2010

(51) Int. Cl.
| | |
|---|---|
| *G06Q 20/00* | (2012.01) |
| *G06F 17/00* | (2019.01) |
| *G06Q 10/10* | (2012.01) |
| *G06Q 30/02* | (2012.01) |

(52) U.S. Cl.
CPC ........... *G06Q 10/107* (2013.01); *G06F 17/00* (2013.01); *G06Q 20/00* (2013.01); *G06Q 30/02* (2013.01); *G06Q 30/0269* (2013.01)

(58) Field of Classification Search
CPC ... G06Q 10/107; G06Q 30/02; G06Q 30/0269
USPC ................. 705/14.53, 14.66, 14.67
See application file for complete search history.

(56) References Cited

U.S. PATENT DOCUMENTS

| | | | | |
|---|---|---|---|---|
| 6,424,359 B1* | 7/2002 | Kobayashi | .......... | G06F 3/04855 715/784 |
| 7,529,797 B2* | 5/2009 | Tseng et al. | .................. | 709/204 |
| 7,577,433 B2* | 8/2009 | Ahopelto et al. | .......... | 455/432.1 |
| 7,711,598 B2* | 5/2010 | Perkowski | .................. | 705/14.51 |
| 7,765,482 B2* | 7/2010 | Wood | .................... | G06Q 30/02 709/201 |
| 7,827,208 B2* | 11/2010 | Bosworth et al. | ............ | 707/802 |
| 7,881,963 B2* | 2/2011 | Chudnovsky et al. | .... | 705/14.16 |
| 7,970,657 B2* | 6/2011 | Morgenstern | ................ | 705/26.1 |
| 7,974,868 B2* | 7/2011 | Tseng et al. | .................. | 705/7.31 |
| 8,234,193 B2* | 7/2012 | Ransom et al. | ................. | 705/35 |
| 8,504,426 B2* | 8/2013 | Petta | ....................... | G06Q 30/02 705/14.73 |
| 8,572,642 B2* | 10/2013 | Schraga | .......................... | 725/32 |
| 2003/0001846 A1* | 1/2003 | Davis et al. | ................... | 345/474 |

(Continued)

FOREIGN PATENT DOCUMENTS

| | | | | | |
|---|---|---|---|---|---|
| WO | WO 2008058262 A2 | * | 5/2008 | ............ | G06F 17/30 |
| WO | WO 2009140488 A1 | * | 11/2009 | | |

OTHER PUBLICATIONS

Facebook; Leading Websites Offer Facebook Beacon for Social Distribution; Nov. 6, 2007; http://www.facebook.com/press/release.php?p=9166 accessed Jun. 8, 2011.*

(Continued)

*Primary Examiner* — Eric R Netzloff
*Assistant Examiner* — Dipen M Patel
(74) *Attorney, Agent, or Firm* — Greenberg Traurig, LLP

(57) ABSTRACT

Systems and methods to facilitate sharing of information and/or experiences among users within advertisements. For example, an advertisement can include a user interface to collect user content and to selectively present, within the advertisement, previously collected user content, while the advertisement presents advertiser content in a web page of a third party.

19 Claims, 5 Drawing Sheets

(56) References Cited

U.S. PATENT DOCUMENTS

| | | | |
|---|---|---|---|
| 2003/0046098 A1* | 3/2003 | Kim | 705/1 |
| 2003/0101412 A1* | 5/2003 | Eid | 715/513 |
| 2005/0050462 A1* | 3/2005 | Whittle et al. | 715/517 |
| 2005/0060180 A1* | 3/2005 | Wood | G06Q 30/02 715/733 |
| 2005/0149397 A1* | 7/2005 | Morgenstern et al. | 705/14 |
| 2005/0203724 A1* | 9/2005 | Orpaz et al. | 703/6 |
| 2005/0289131 A1* | 12/2005 | Aenlle et al. | 707/3 |
| 2006/0004713 A1* | 1/2006 | Korte et al. | 707/3 |
| 2006/0085253 A1* | 4/2006 | Mengerink et al. | 705/14 |
| 2006/0212355 A1* | 9/2006 | Teague et al. | 705/14 |
| 2006/0271438 A1* | 11/2006 | Shotland et al. | 705/14 |
| 2006/0277477 A1* | 12/2006 | Christenson | 715/760 |
| 2007/0038931 A1* | 2/2007 | Allaire et al. | 715/526 |
| 2007/0100650 A1* | 5/2007 | Ramer | G06F 17/30749 705/26.1 |
| 2007/0106551 A1* | 5/2007 | McGucken | G06Q 30/02 705/7.29 |
| 2007/0121843 A1* | 5/2007 | Atazky et al. | 379/114.13 |
| 2007/0230374 A1* | 10/2007 | Altberg et al. | 370/271 |
| 2007/0239541 A1* | 10/2007 | Kane et al. | 705/14 |
| 2007/0282675 A1* | 12/2007 | Varghese | G06Q 30/02 705/14.1 |
| 2008/0004959 A1* | 1/2008 | Tunguz-Zawislak et al. | 705/14 |
| 2008/0040175 A1* | 2/2008 | Dellovo | 705/7 |
| 2008/0065481 A1* | 3/2008 | Immorlica et al. | 705/14 |
| 2008/0109750 A1* | 5/2008 | Lin-Hendel | G06F 3/0485 715/785 |
| 2008/0140502 A1* | 6/2008 | Birnholz | G06Q 30/02 705/14.72 |
| 2008/0147482 A1* | 6/2008 | Messing | G06Q 30/02 705/14.53 |
| 2008/0168489 A1* | 7/2008 | Schraga | 725/32 |
| 2008/0177994 A1* | 7/2008 | Mayer | 713/2 |
| 2008/0215428 A1* | 9/2008 | Ramer et al. | 705/14 |
| 2008/0256451 A1* | 10/2008 | Chu et al. | 715/722 |
| 2008/0294716 A1* | 11/2008 | Couvreur | 709/203 |
| 2008/0320533 A1* | 12/2008 | Kitazato | 725/98 |
| 2009/0018917 A1* | 1/2009 | Chapman et al. | 705/14 |
| 2009/0024649 A1* | 1/2009 | Broder et al. | 707/102 |
| 2009/0037315 A1* | 2/2009 | Chu | G06F 17/30038 705/37 |
| 2009/0048921 A1* | 2/2009 | Tokuda | G06Q 30/0273 705/14.69 |
| 2009/0049127 A1* | 2/2009 | Juan et al. | 709/204 |
| 2009/0060464 A1* | 3/2009 | Hornsby et al. | 386/117 |
| 2009/0070204 A1* | 3/2009 | Clancy et al. | 705/14 |
| 2009/0099931 A1* | 4/2009 | Aaltonen et al. | 705/14 |
| 2009/0106200 A1* | 4/2009 | Salinas | G06F 17/30781 |
| 2009/0119165 A1* | 5/2009 | Cotgreave | 705/14 |
| 2009/0132366 A1* | 5/2009 | Lam et al. | 705/14 |
| 2009/0150405 A1* | 6/2009 | Grouf et al. | 707/10 |
| 2009/0150920 A1* | 6/2009 | Jones | 725/23 |
| 2009/0157559 A1* | 6/2009 | Wu et al. | 705/80 |
| 2009/0182621 A1* | 7/2009 | McCourt | 705/10 |
| 2009/0193457 A1* | 7/2009 | Conn | G06Q 30/0241 725/34 |
| 2009/0282433 A1* | 11/2009 | Petta | G06Q 30/02 725/32 |
| 2010/0010884 A1* | 1/2010 | Cohee | G06Q 30/02 705/14.12 |
| 2010/0088182 A1* | 4/2010 | Ryder et al. | 705/14.66 |
| 2010/0114783 A1* | 5/2010 | Spolar | 705/80 |
| 2010/0138452 A1* | 6/2010 | Henkin et al. | 707/803 |
| 2010/0241507 A1* | 9/2010 | Quinn et al. | 705/14.42 |
| 2010/0281421 A1* | 11/2010 | Lin-Hendel | G06F 3/0485 715/785 |

OTHER PUBLICATIONS

Wikipedia; Viral Marketing; http://en.wikipedia.org/wiki/Viral_advertising accessed Jun. 8, 2011.*

Patton, Eileen; STIC USPTO internal Search Report #456623 EIC 3600; completed Aug. 27, 2014; PDF format.*

Roberts, Caroline; "Go Elf Yourself"; Bostonist Dec. 24, 2006; from http://bostonist.com/2006/12/24/go_elf_yourself.php accessed Aug. 25, 2014; PDF format.*

Cookies, Oct. 2, 2007, Department of Computer Science at North Carolina State University, https://ethics.csc.ncsu.edu/privacy/web/cookies/study.php (Year: 2007).*

Wauters, Robin, "ONEsite Launches Proprietary Social Ad Platform," TechCrunch, http://www.techcrunch.com/2008/11/17/onesite-launches-interactad-proprietary-social-ad-platform/; Nov. 17, 2008.

Kaye, Kate, "New Facebook Ads Help Connect User with Advertisers," The ClickZ Network, located at http://www.clickz.com/showPage.html?page=3630612, Aug. 22, 2008.

Walsh, Mark, "Show Me the Money: Faebook Tests Engagement Ads," MediaPost Publications, located at http://www.mediapost.com/publications/?fa=Articles.san&s=89018&Nid=46378&p=425045, Aug. 22, 2008.

Owyang, Jeremiah, "What Facebook's New 'Engagement Advertising' Means to Brands," The Forrester Blog for Interactive Marketing Professionals, located at http://blogs.forrester.com/marketing/2008/08/what-facebooks.html, Aug. 21, 2008.

Wikimedia Foundation, Inc., "Social Media," Wikipedia, located at http://en.wikipedia.org/wiki/Social_media, Aug. 15, 2008.

* cited by examiner

SYSTEM AND METHODS TO FACILITATE SOCIAL MEDIA

FIELD OF THE TECHNOLOGY

At least some embodiments of the disclosure relate to user interface in general and, more particularly but not limited to, user interface for advertisements.

BACKGROUND

There are a number of Internet applications that support social media, which includes user activities to share and discuss information and experiences.

For example, a web site hosting a social network may allow its members to share information among friends, such as photos, videos, stories, messages, etc. The web site may register members and allow the members to specify their friends among the registered members. The social network represents a social structure in which a network of nodes can be used to represent a network of individuals or organizations and the connections between the nodes in the network represent the direct social connections (e.g., connections to friends of the members).

SUMMARY OF THE DESCRIPTION

Systems and methods to facilitate sharing of information and/or experiences among users within advertisements are described herein. Some embodiments are summarized in this section.

In one embodiment, an advertisement includes a user interface to collect user content and to selectively present, within the advertisement, previously collected user content, while the advertisement presents advertiser content in a web page of a third party.

In one embodiment, a method includes receiving first content from a first user; and providing the first content within an advertisement using a data processing system, where the advertisement is presented on behalf of an advertiser to a second user within a web page of a third party. The advertisement can be presented on behalf of the advertiser in a plurality of web pages of different entities.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
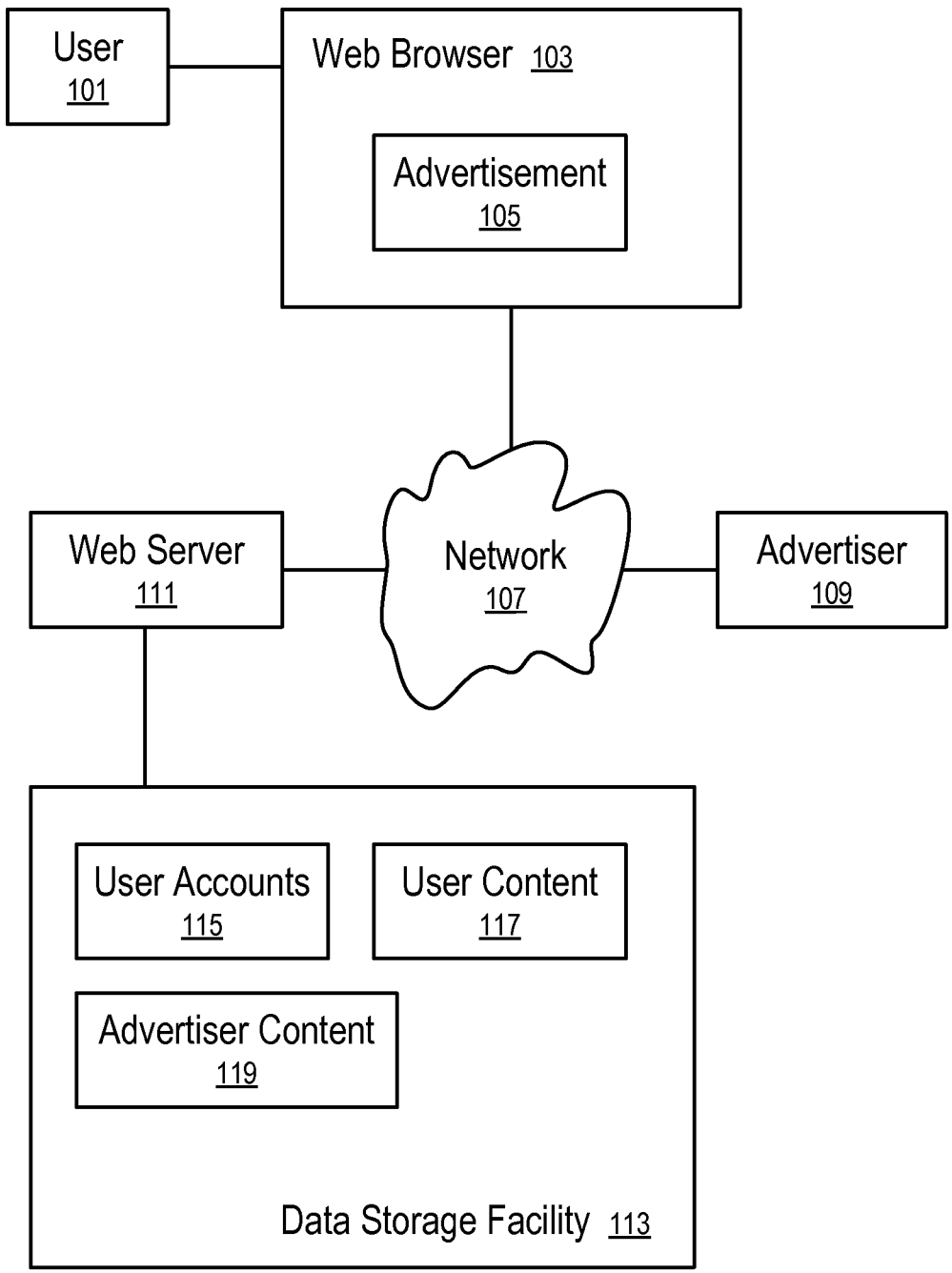
FIG. 1 illustrates a system to facilitate social media via an advertisement according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

One embodiment of the disclosure provides an advertisement platform that allows a user to provide user generated content as part of an advertisement. The user generated content may include text and/or media provided by end users, such as comments, photos, videos, reviews, blog posts, etc. The user generated content can be reviewed by a moderator before being integrated into the advertisement. Thus, the advertisement increases the level of user interaction and facilitates two-way content sharing.

In one embodiment, users can interact with the consumer-centric and conversational advertisement. The advertisement combines an industry standard-bearing platform for the delivery of integrated social media with the natural interactions about brand relevant topics to extend the content and the utility for advertising creating. Social media capabilities are incorporated into existing rich media advertisement formats. In one embodiment, user interfaces for displaying user photos, gathering recommendations/ratings, supporting submission of comments/testimonials, etc., are integrated within the advertisement. Thus, the advertisement can broadcast content from a social network while also enabling interaction with the network from third party locations. Such capabilities will support multiple advertisement drivers, such as aspirational marketing, lead generation, research, etc.

In one embodiment, social media is embedded within advertisements created to enable both qualitative and quantitative feedback, enhance targeting capabilities, optimize campaign return on investment (ROI) through test and control scenarios, facilitate engagement around campaign branding and messaging, and measure effectiveness of brand advertisements in real time.

In one embodiment, social media features, such as customer comments and user-generated content, are injected into digital advertisements to provide a social advertising service, which allows marketers to embed social media technology into Interactive Advertising Bureau-standard advertising units that are distributed wherever consumers live in the digital world, allowing the user to have an effect on the content of the advertisement and/or to engage with the advertisement by submitting information "in place". It provides the consumers with a stronger voice in the conversation with the marketer, allowing pervasive and contextual consumer participation and social influence inside the impressions received by traditional digital advertisement units like banner advertisements.

For instance, a film studio might announce a new movie through a banner advertisement that enables consumers to review the movie by clicking on the advertisement, as well as read feedback from other movie goers—without leaving the point of display for the advertisement. Thus, marketers can bring a social experience into the world of digital advertising.

In one embodiment, the customers can access the social media elements within the advertisement or in a web site linked to the advertisement. The web site may present the user generated content together with the advertisement itself. The web site can be implemented as social microsites, a landing spot for advertisement click throughs and other campaign tie-ins. The social microsites will act as an aggregation point for interactions occurring in the distributed advertisements. In one embodiment, the microsite is a temporary hyper-focused website that acts as the basis for an online marketing campaign.

In one embodiment, some of the user contents are collected via the user interface presented within the advertisement, which can be distributed via the web sites of third parties; and some of the user contents are collected via the separate, more fully featured web site that is associated with or linked to the advertisement. Thus, the system provides a unified way to collect user content via various different user interfaces (e.g., user interfaces embedded within advertisements presented on a network of third party web sites and use interfaces presented on a full featured web site); and the system provides a unified way to present the user content within the advertisement shown on the network of third party web sites and/or present the user content in the separate, more fully featured web site. Thus, the system provides a coordinated way for distributed content creation/collection across a network of web sites that display the advertisement. The user interface embedded in the advertisement provides aggregated, distributed presentation of interactions across the network of web sites that display the advertisement. In one embodiment, the users can interact with the advertisement at any web sites that displays the advertisement, not just the web sites on which the community of the users live (e.g., not just the web site of a social network to which the users belong).

In one embodiment, the advertisement provides rich capabilities, not only allowing the users to interact in-place within the advertisement, but also allowing the users to follow a link in the advertisement to visit the microsite for a full featured interface. For example, the advertisement allows a user to create an account in-place within the advertisement, or to follow the link to the microsite to create an account. For example, the user may submit data in-place within the advertisement, or to following the link to the microsite to submit data.

In one embodiment, the advertisement determines if the user has signed into his or her account. After the user signs into his or her account, the advertisement can track the user interaction with the advertisement and associate the tracked user interaction with identifiable personal information. Thus, the advertisement can gather personal information related to the users who view and/or interact with the advertisement.

In one embodiment, a customer can react to an advertisement by commenting, recommending, voting, and/or rating using a user interface provided in the advertisement. The customer may view user generated content within the advertisement, such as photos, videos, posts, etc. The advertisement platform may automatically organize or filter the user content based on various criteria such as most recently updated, most recently created, most commented, most reviewed, most recommended, highest rated, most active, within a category identified by tags, etc. In one embodiment, the filtering is performed based on a preference of the customer, identified after the customer signs in an account or identified based on preferences previously stored within the web browser used by the customer.

In one embodiment, the advertisement may scroll through the large collection of user generated content automatically, or in response to a user input. For example, the advertisement may automatically scroll through the collection based on a timer and/or in response to a hoverover event (e.g., when the user places a cursor over a portion of the advertisement for a period of time). Alternatively, the advertisement may scroll through the collection based on the position of a slider controlled by the user, or based on the user selecting a scroll arrow. In some embodiments, the collection of user content can be presented via paginated lists.

In one embodiment, a customer may contribute to the content of the advertisement by submitting items using a user interface presented within the advertisement. For example, the customer may submit a photo or a video, post a story, perspective or experience (via comment or group blog, etc.), ask a question (via comment, group blog post, or forum post, etc.), provide an answer (via comment, group blog post or forum post, etc.), review an item in free form, provide star or numerical rating, provide parametric response, etc.

In one embodiment, the advertisement can be used to gather various information about potential customers, such as name and address for lead identification, age and gender for demographic classification, and custom questions such as interests, location, etc.

In one embodiment, the advertisement platform allows a moderator to selectively approve or disapprove user content. For example, in a pre-moderation process a moderator may proactively review and approve content before it is displayed, such as photos, videos, comments, blog posts, reviews, forum posts, etc. For example, a moderator may reactively review and delete/quarantine user content (e.g., photos, videos, comments, blog posts, reviews, forum posts) after it is displayed within the advertisement. In some embodiments, a filter may be used to reject objectionable content based on words contained in the user generated content.

In one embodiment, in addition to the pre-moderation by a moderator, editorial selection is implemented as a second pass filtering of user content. Advertisers may be very selective regarding what user content may appear in their advertisement. The system provides the advertiser with the ability to select user content that has passed the pre-moderation. Thus, the user content can be selected by the moderator and then by the advertiser/editor for inclusion in the advertisement.

Alternatively, the user content may be included in the advertisement after passing the pre-moderation; and the advertiser/editor may reactively reject certain user content. Alternatively, one or more moderators and the advertiser/editor may independent reject the user content, after the user content is included in the advertisement in an automated process.

In one embodiment, the advertisement may display information about a contributor next to the corresponding user generated content received from the contributor. The information about a contributor may include a username, an avatar, a recommendation count; and a user may recommend another user.

In one embodiment, a user can contribute a photo or video for inclusion in a gallery. The contributing user may provide metadata to describe the title, tags, description and creator. Viewers of the photo or video can provide comments, recommendation, rating, etc.

In one embodiment, a user can provide a public blog post or a forum post, including the title, body, identification of the creator, etc. Viewers of the photo or video can provide comments, recommendation, rating, etc.

In one embodiment, a user can add content to an advertisement via comments, reviews, ratings, recommendations, etc. In one embodiment, a comment includes body (e.g., the main text of the comment), identification of the creator, a recommendation count, etc. Users who recommend the comment can increase the recommendation count of the comment. In one embodiment, a review includes a title, a body, an argument or consideration in favor of an item being reviewed, an argument or consideration not in favor of the item being reviewed, a rating of the item being reviewed, etc.

The integration of social media with the advertisement can improve the performance of the advertisement and increase the information that can be collected via the advertisement. For example, the performance of the advertisement based on the click-through rate, call to action rate, lead collection rate, etc., can be improved. Information such as user generated content, feedback, viewer opt-ins (e.g., to purposefully accept some situation or condition ahead of time), etc., can be gathered via the advertisement.

In one embodiment, the advertisement platform provides reporting facilities to identify user contributions, general activities, etc.

FIG. 1 illustrates a system to facilitate social media via an advertisement according to one embodiment.

In FIG. 1, a data storage facility (113) is used to store advertiser content (119) and user content (117). Optionally, the data storage facility (113) also stores user accounts (115) to identify the creators of the user content (117) and/or to present the user content (117) and/or the advertisement content (119) based on the preferences of the users (e.g., 101).

In one embodiment, the user content (117) is collected from and/or presented to the users (e.g., 101) via the advertisement (105). Alternatively or in combination, the user content (117) can also be collected from and/or presented to the users (e.g., 101) via a separate web site, such as a persistent social network web site, or a social network microsite.

In one embodiment, the web server (111) is used to provide the advertisement (105) to the web browser (103) over the network (107) for presentation to the user (101), on behalf of the advertiser (109). The advertisement (105) may be presented as a portion of a web page presented via the web server of a third party (not shown in FIG. 1). The web server (111) selectively provides user content (117) as a portion of the advertisement (105), in addition to the advertiser content (119).

In one embodiment, when the user selects the advertisement (105), a link in the advertisement (105) causes the web browser (103) to visit a web site, which may provide further user interfaces to interact with the user content (117) and/or the advertiser content (119). The web site may be hosted on the web server (111), or be hosted on a separate server of the advertiser (109) (not shown in FIG. 1).

In one embodiment, the user (101) can use the web browser (103) to view the advertisement (105) and use the user interface embedded in the advertisement (105) to submit user content (117) to augment, modify, and/or change the advertisement (105).

In one embodiment, the advertiser (109), or a separate moderator (not shown in FIG. 1), may proactively approve or disapprove user content (117) for inclusion in the advertisement (105), or reactively block the presentation of a portion of the user content (117) for inclusion in the advertisement (105).

In one embodiment, the advertiser (109) submits the advertiser content (119) to the data storage facility (113) via the web server (111). The advertiser (109) may subsequently modify the advertiser content (119) via the web server (111).

Figure 2:
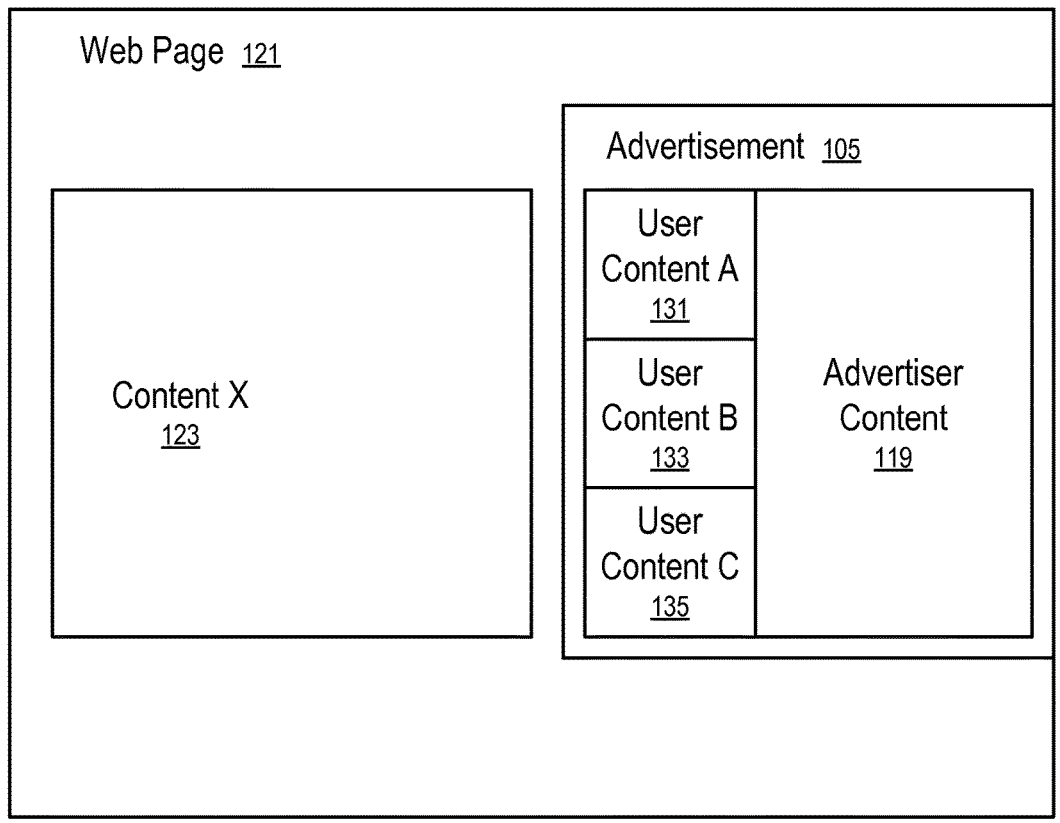
FIGS. 2 and 3 illustrate an example of presenting user content in an advertisement according to one embodiment.
Figure 3:
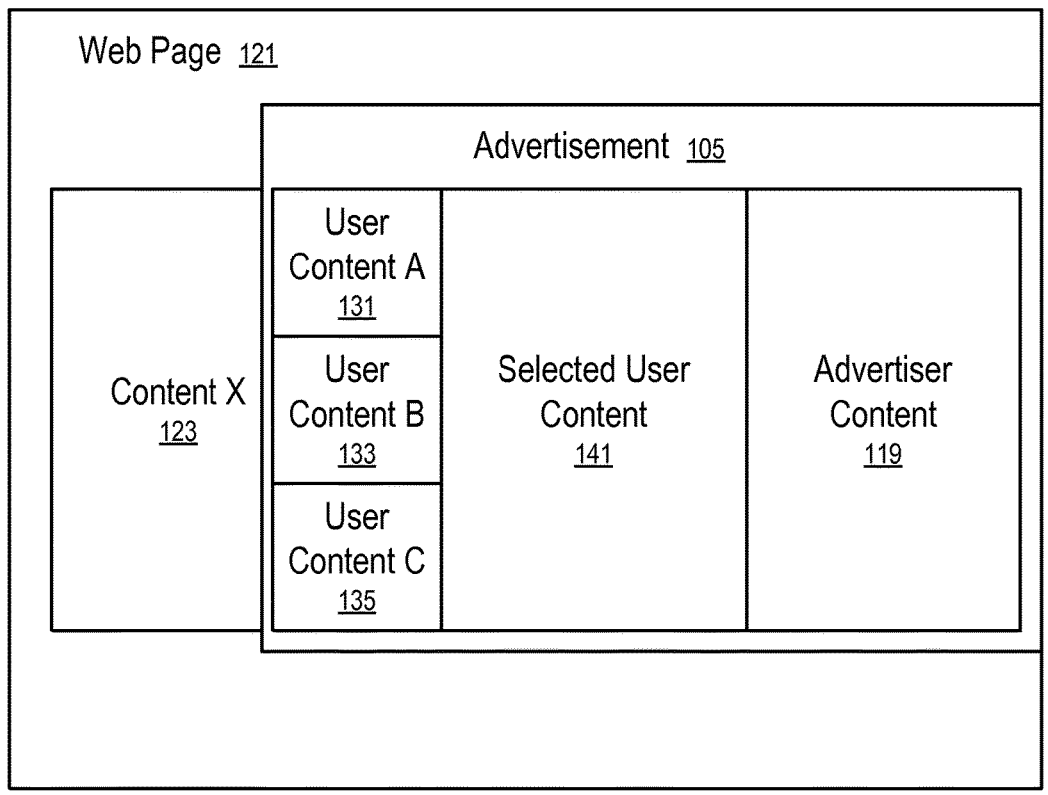

FIGS. 2 and 3 illustrate an example of presenting user content in an advertisement according to one embodiment.

In FIG. 2, the web page (121) includes content (123) and an advertisement (105). In one embodiment, the advertisement (105) is presented via an embedded media player that supports user interaction, such as an Adobe Flash™ player. Alternatively, the advertisement (105) can also be presented via other techniques, such as scripts embedded in or linked in the web page (121), servlets hosted on the web server (111), etc.

In FIG. 2, the advertisement (105) includes advertiser content (119) to promote the services and/or products of the advertiser (109) and/or the brand name of the advertiser (109). The advertisement (105) further includes a list of user content (131-135), selectable by the user (101) for interaction.

In one embodiment, the list of user content (131-135) includes icon images or thumbnail images (e.g., size reduced versions of image representations of the user content). The list of user content (131-135) is selected from the user content (117) collected from the previous viewers of the advertisement (105).

In one embodiment, the list of user content (131-135) contains a large number of items. The advertisement (105) automatically scrolls the list (131-135) to present a portion of the list at a time. The user (101) may use an input device to control the scrolling of the list and to select an item from the list.

FIG. 3 illustrates an example to display selected user content (141) after the user (101) selects an item from the list of user content (131-135). In FIG. 3, in response to the user selecting the item, the advertisement (105) expands to provide an area to display the selected user content (141). For example, the advertisement (105) may be presented on a layer on top of the content (123). Thus, when the advertisement (105) expands to display the selected user content (141), a portion of the content (123) is covered under the advertisement (105).

In one embodiment, the user (101) can interact with the selected user content (141) without leaving the web page (121). The selected user content (141) may include a photo, a video, a blog or forum post, etc. The selected user content may include personal information about the creator/provider of the selected user content (141), such as a username, an avatar of the creator/provider, a count of recommendations of the creator/provider by other users, a count of friends of the creator/providers in a social network, etc. The user (101) can provide comments, reviews, ratings, recommendations related to the selected user content (141) and/or the advertiser content (119).

For example, the selected user content (141) may include a photo or a video from another user. The user (101) may select the photo or video to request a user interface to provide comments, recommendations, ratings and/or reviews for the photo or video. For example, the user (101) may select the user name of the creator of the photo or video to request communications with the creator (e.g., sending an invitation to establish a friend relationship in the social network, sending a private message, recommending the creator, etc.). Thus, the advertisement may be used as a portal for the social network.

While FIG. 3 illustrates an example of presenting the selected user content (141) and advertiser content (119) concurrently, the advertisement (105) may alternatively provide the selected user content (141) in the area previously used to present the advertiser content (119). After the user completes interaction with the selected user content (141), the advertisement (105) returns to the presentation of the advertiser content (119) in the same area. Thus, it may not be necessary for the advertisement (105) to expand and to cover the content (123) temporarily.

In one embodiment, the advertisement (105) includes a user interface element which can be selected to cause the presentation of a user interface within the advertisement (105) for the submission of user content from the user (101). For example, the user (101) may submit a photo or a video related to the advertiser content (119). The content submitted by the user (101) may appear in the advertisement (105) after a moderator (e.g., the advertiser (109)) reviews and approves the inclusion of the content received from the user (101). Alternatively, the content submitted by the user (101) may be automatically included in the advertisement (105); and the moderator (e.g., the advertiser (109) or others) may subsequently disapprove the inclusion, thus causing the disapproved content to be excluded/removed from the advertisement (105).

In one embodiment, the advertisement (105) is presented via a reference to the web server (111) embedded in the web page (121). Thus, the advertisement (105) can be embedded in other web pages (121) via the reference.

In one embodiment, the user is required to sign in to interact with certain portions of the advertisement. For example, the user may be required to sign into the web server (111) prior to submitting user contents, such as comments, recommendations, photos, videos, ratings, etc. Once the user signs in the web server (111), the web server (111) may selectively present the list of user content (131-135) based on the preferences of the user.

Figure 4:
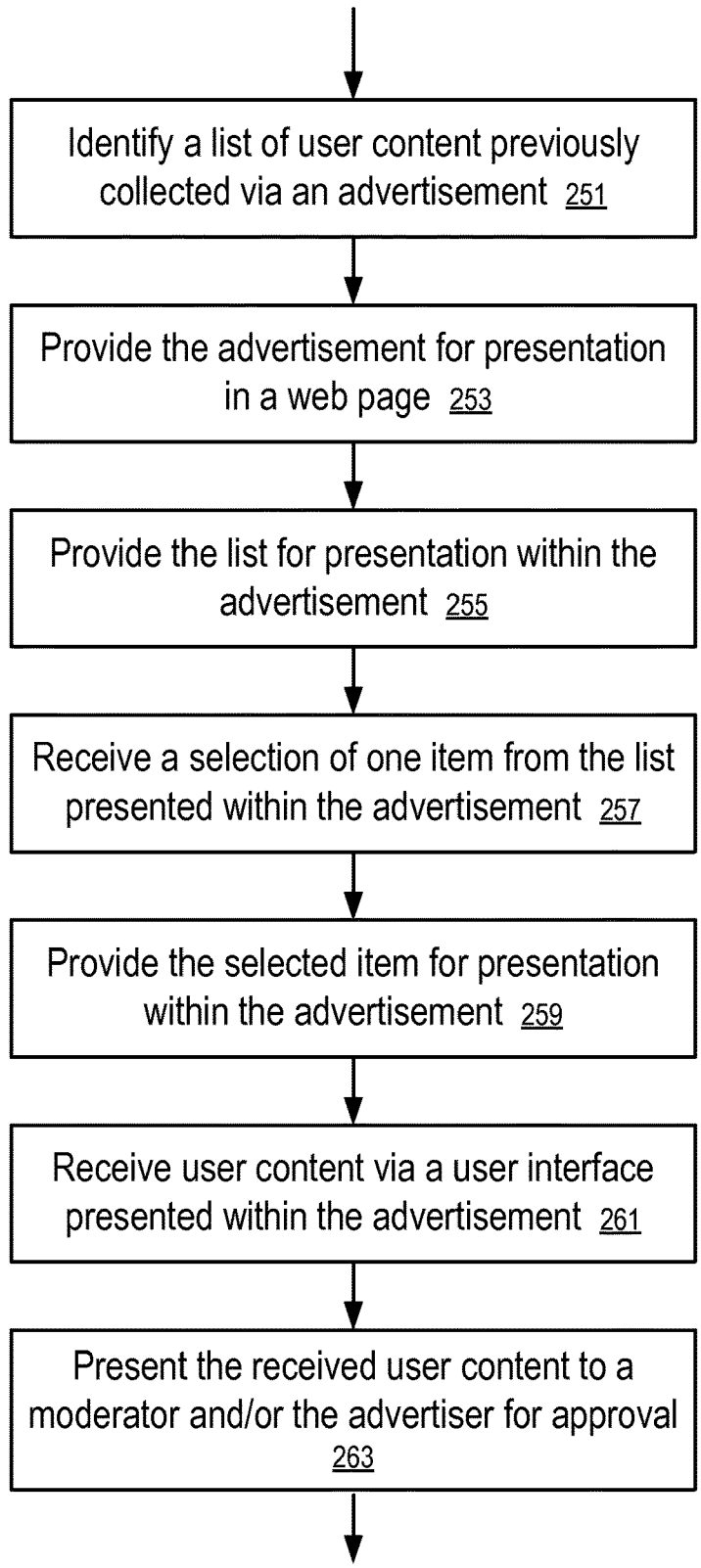
FIG. 4 shows a method to present user content in an advertisement according to one embodiment.

FIG. 4 shows a method to present user content in an advertisement according to one embodiment.

In FIG. 4, a list of user content (131-135) previously collected via an advertisement (105) is identified (251) for the presentation of the advertisement (105). The advertisement (105) is provided (253) for presentation in a web page (121); and the list is provided (255) for presentation within the advertisement (105).

After receiving (257) a selection of one item from the list presented within the advertisement (131-135), the web server (111) provides (259) the selected item for presentation within the advertisement (105).

After receiving (261) user content (117) via a user interface presented within the advertisement (105), the web server (111) presents (263) the received user content (117) to a moderator and/or the advertiser for approval. In one embodiment, the approved user content (117) can be included in subsequent presentation of the advertisement (105). In one embodiment, disapproved user content (117) will be excluded from subsequent presentation of the advertisement (105).

In one embodiment, the user content is first presented to the moderator for approval. After the user content is approved for inclusion in the advertisement by the moderator, the user content is further presented to the advertiser (or an editor) for approval. Thus, the advertiser can control what user content appears in the advertisement. In one embodiment, the moderator approval is implemented via a set of automated filtering functions. In another embodiment, the moderator approval is implemented via human operators of a service provider, which is an entity different from the advertiser. The advertiser and/or an editor represents the advertiser may selectively approve or reject the user content that are approved by the moderator. Alternatively, the system may directly submit the user contents to the advertiser/editor for approval.

In one embodiment, first content is received from a first user and provided within an advertisement for presentation on behalf of an advertiser to a second user, within a web page of a third party. The first content can be received from the first user via a user interface embedded within the advertisement presented to the first user, or via a user interface presented in a web site linked to the advertisement. The first content may be a comment, a recommendation, a story, a question, an answer, a review, a photo, or a video.

In one embodiment, second content is received from the second user via a user interface provided within the advertisement while the advertisement is presented within the web page of the third party; and the second content is provided within the advertisement presented to the second user, or a web site linked to the advertisement. In one embodiment, a web site is presented on behalf of the advertiser to interact with the second user in response to the second user selecting a user interface element from the advertisement.

In one embodiment, a subset of content is selected from a set of content received from a plurality of users via a user interface embedded with the advertisement; and the subset of content is provided in the advertisement presented to the second user.

In one embodiment, a user interface is provided to a moderator to approve or disapprove individual content for inclusion in the advertisement. The moderator may be the advertiser.

In one embodiment, the second user is authenticated for interaction with the advertisement; and information about the second user, such as name, email address, age, gender, interest, and location, etc., is associated with interaction of the second user with the advertisement. Statistics related to the user interaction and advertisement performance can be collected, such as impressions (e.g., number of presentations of the advertisement), number of times the user interface elements in the advertisement were interacted with, number of user accounts created via the advertisement, amount of data collected via the advertisement, etc.

In one embodiment, when the user is not already a member of the social network, the user may use a user interface presented within the advertisement to register and become a member.

For example, an advertising agency can develop an advertisement campaign to attract an audience to a new line of products. The campaign is centered on the viewer helping to determine which limited edition colors will be available for this year's model. As viewers consider the potential colors, they are presented with details about the new models and given an opportunity to submit their email address so they can be notified of the results.

Social media elements are added into the advertisement campaign. When the advertisement media creative work is completed, the social media design is performed, which takes into account the rich media guidelines established by the advertisement server (e.g., 111).

When a first user, Bob, is shopping for products on a website, he notices the advertisement, which presents four color options, each showing its rank based on votes from other viewers. Bob decides to vote so he expands the advertisements. In this larger view of the advertisement, presented without leaving the web page that hosts the advertisement, Bob can submit his color suggestion and, optionally, provide his email address to receive information about which color is selected. Additionally he sees further information about the new product.

A moderator, Steve, is responsible for the social media element of the advertisement campaign. As part of his responsibilities, Steve monitors the activity/performance and exports the information about viewers that have opted-in to being contacted.

To engage the audience the advertisement may further solicit pictures related to the advertised products. Submitted photos will be approved by the moderator and then will be visible in the advertisement, where viewers can vote on their favorites as well as submit their own photos.

A microsite may be used as a landing page for the advertisement campaign, which may include advertisements presented online, via TV and/or via print. Bob may see that the advertisement contains photos from other viewers. He wants to see more so he expands the advertisement and looks at the additional photos, recommending some of them. Bob submits his email address so that he can be contacted regarding the winner of the contest.

A second user, Jane, is on another website and navigates to a page where the advertisement is displayed. She sees that there is a contest for the best photo related to the advertised products. After reviewing the current photos Jane decides to submit some of her photos. In order to submit, Jane is directed to the microsite where she is asked for contact information, in the event she wins, and then is allowed to upload her photos. She is informed that her photos will be visible as soon as they're approved. While on the microsite, Jane explores some of the related content.

The moderator, Steve, is responsible for reviewing photo submissions before they become active on the site.

In one embodiment, a social network site is linked to the advertisement and used as a landing page during the advertisement campaign. The social network site exists independent of the advertisement. Thus, the social network site is accessible after the advertisement campaign ends and/or before the advertisement campaign begins.

Figure 5:
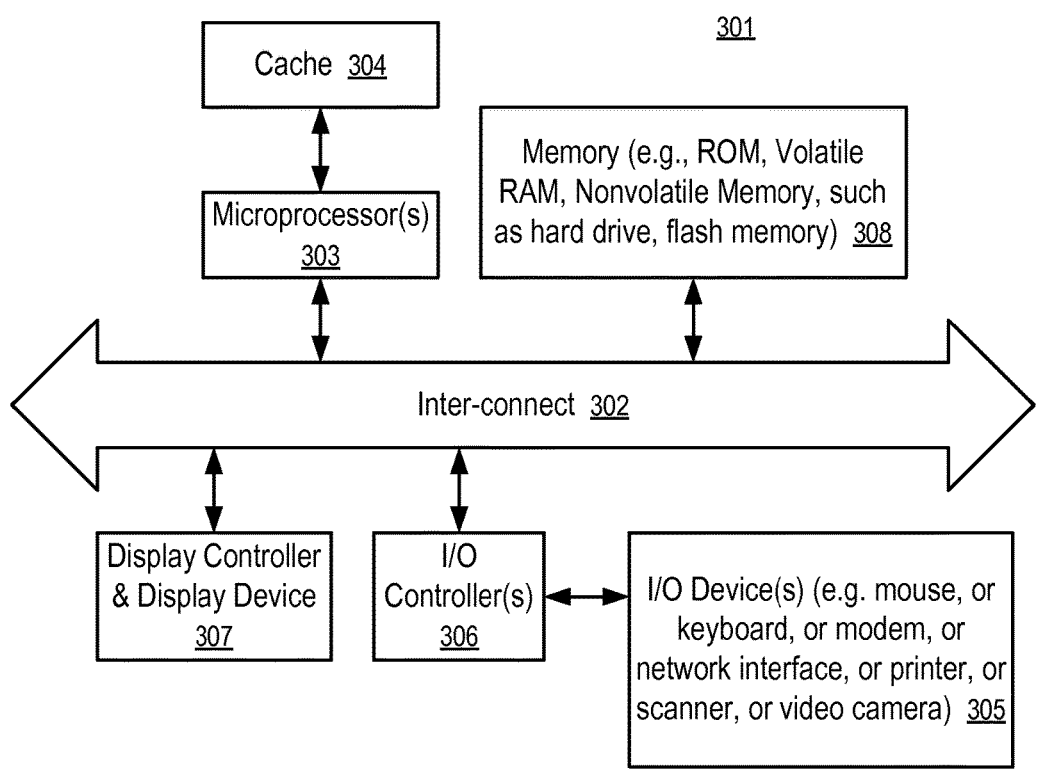
FIG. 5 shows a data processing system which can be used in various embodiments.

FIG. 5 shows a data processing system which can be used in various embodiments. For example, a user terminal as a data processing system illustrated in FIG. 5 can be used to present the web browser (103). For example, a server system as a data processing system illustrated in FIG. 5 can be used to implement the web server (111).

While FIG. 5 illustrates various components of a computer system, it is not intended to represent any particular architecture or manner of interconnecting the components. Some embodiments may use other systems that have fewer or more components than those shown in FIG. 5.

In FIG. 5, the data processing system (301) of the portable device (203) includes an inter-connect (302) (e.g., bus and system core logic), which interconnects a microprocessor(s) (303) and memory (308). The microprocessor (303) is coupled to cache memory (304) in the example of FIG. 5.

The inter-connect (302) interconnects the microprocessor(s) (303) and the memory (308) together and also interconnects them to a display controller, display device (307) and to peripheral devices such as input/output (I/O) devices (305) through an input/output controller(s) (306).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   causing, by a data processing system, an advertisement of an advertiser to be displayed within a web page, via an embedded media player that supports user interaction, on a first display device associated with a first user, the advertisement comprising advertiser content and a user interface element embedded within the advertisement, wherein the user interface element is configured to present, in response to a user selection, a user interface within the advertisement wherein the user interface allows for the input of a content item submitted by the first user and the transmission of the content item to a remote processing device;
   receiving, over a network, at least one content item from the first user via the user interface element;
   presenting the at least one content item to the advertiser, wherein the at least one content item comprises at least one of a photo and a video;
   receiving, from the advertiser one of: an approval of the at least one content item and a disapproval of the at least one content item;
   identifying a plurality of content items submitted via the advertisement, wherein each respective content item is received via the advertisement via a respective one of a plurality of users, such that the at least one content item is identified as being submitted via the advertisement;
   causing the advertisement to be displayed within a web page on a second display device associated with a second user, such that where an approval of the at least one content item was received from the advertiser, the at least one content item is displayed within the advertisement and where a disapproval of the at least one content item was received from the advertiser, the at least one content item is not displayed within the advertisement, wherein the identified content items are displayed within the advertisement as a list of content items, the list of content items comprising a plurality of list entries, each list entry being associated with a respective one of the identified content items and each list entry comprising an image representation of the content item associated with the list entry;
   receiving, from the second user, a selection of one list entry of the plurality of list entries;
   causing the respective one of the identified content items associated with the selected one list entry to be displayed within the advertisement displayed within the web page on the second display device; and
   filtering the at least one content item based on user preferences associated with the second user, wherein the user preferences associated with the second user are based on preferences previously stored within a web browser used by the second user.

2. The method of claim 1, wherein the at least one content item further comprises at least one of a comment, a recommendation, a story, a question, an answer, and a review.

3. The method of claim 1, wherein the display of the list of content items comprises scrolling the list according to an input from the second user.

4. The method of claim 1, wherein the list of content items comprises a respective icon image for each list entry of the list of content items.

5. The method of claim 1, wherein the causing the respective one of the identified content items associated with the selected one list entry to be displayed within the advertisement comprises expanding an area allocated for the advertisement to present the respective one of the identified content items.

6. The method of claim 5, wherein the area is in one of a plurality of layers of the web page.

7. The method of claim 1, further comprising: authenticating the second user for interaction with the advertisement.

8. The method of claim 7, further comprising: associating information about the second user with interaction of the second user with the advertisement.

9. The method of claim 8, wherein the information about the second user includes at least one of name, email address, age, gender, interest, and location.

10. A data processing system, comprising:
a processor; and
memory coupled to the processor and storing instructions that, when executed by the processor, cause the data processing system to:
cause an advertisement of an advertiser to be displayed within a web page, via an embedded media player that supports user interaction, on a first display device associated with a first user, the advertisement comprising advertiser content and a user interface element embedded within the advertisement, wherein the user interface element is configured to present, in response to a user selection, a user interface within the advertisement wherein the user interface allows for the input of a content item submitted by the first user and the transmission of the content item to a remote processing device;
receive, over a network, at least one content item from the first user via the user interface element;
present the at least one content item to the advertiser, wherein the at least one content item comprises a photo;
receive, from the advertiser one of: an approval of the at least one content item and a disapproval of the at least one content item;
identify a plurality of content items submitted via the advertisement, wherein each respective content item is received via the advertisement via a respective one of a plurality of users, such that the at least one content item is identified as being submitted via the advertisement;
cause the advertisement to be displayed within a web page on a second display device associated with a second user, such that where an approval of the at least one content item was received from the advertiser, the at least one content item is displayed within the advertisement and where a disapproval of the at least one content item was received from the advertiser, the at least one content item is not displayed within the advertisement, wherein the identified content items are displayed within the advertisement as a list of content items, the list of content items comprising a plurality of list entries, each list entry being associated with a respective one of the identified content items and each list entry comprising an image representation of the content item associated with the list entry;
receive, from the second user, a selection of one list entry of the plurality of list entries;
cause the respective one of the identified content items associated with the selected one list entry to be displayed within the advertisement displayed within the web page on the second display device; and
filter the at least one content item based on user preferences associated with the second user, wherein the user preferences associated with the second user are based on preferences previously stored within a web browser used by the second user.

11. A non-transitory computer readable medium storing instructions that, when executed by a computer system, cause the computer system to:
cause an advertisement of an advertiser to be displayed within a web page, via an embedded media player that supports user interaction, on a first display device associated with a first user, the advertisement comprising advertiser content and a user interface element embedded within the advertisement, wherein the user interface element is configured to present, in response to a user selection, a user interface within the advertisement wherein the user interface allows for the input of a content item submitted by the first user and the transmission of the content item to a remote processing device;
receive, over a network, at least one content item from the first user via the user interface element;
present the at least one content item to the advertiser, wherein the at least one content item comprises a video;
receive from the advertiser one of: an approval of the at least one content item and a disapproval of the at least one content item;
identify a plurality of content items submitted via the advertisement, wherein each respective content item is received via the advertisement via a respective one of a plurality of users, such that the at least one content item is identified as being submitted via the advertisement;
cause the advertisement to be displayed within a web page on a second display device associated with a second user, such that where an approval of the at least one content item was received from the advertiser, the at least one content item is displayed within the advertisement and where a disapproval of the at least one content item was received from the advertiser, the at least one content item is not displayed within the advertisement, wherein the identified content items are displayed within the advertisement as a list of content items, the list of content items comprising a plurality of list entries, each list entry being associated with a respective one of the identified content items and each list entry comprising an image representation of the content item associated with the list entry;
receive, from the second user, a selection of one list entry of the plurality of list entries;
cause the respective one of the identified content items associated with the selected one list entry to be displayed within the advertisement displayed within the web page on the second display device; and
filter the at least one content item based on user preferences associated with the second user, wherein the user preferences associated with the second user are based on preferences previously stored within a web browser used by the second user.

12. The method of claim 1, wherein the display of the list of content items comprises scrolling the list automatically based on a timer.

13. The method of claim 1, wherein the filtering includes rejecting objectionable content based on elements contained in the at least one content item.

14. The method of claim 1, wherein metadata associated with the at least one content item is received with the receiving of the at least one content item.

15. The method of claim 14, wherein the filtering includes rejecting objectionable content based on elements contained in the at least one content item, and wherein the elements include parts of the metadata associated with the at least one content item.

16. The non-transitory computer readable medium of claim 11, wherein the display of the list of content items comprises scrolling the list automatically based on a timer.

17. The non-transitory computer readable medium of claim 12, wherein the filtering includes rejecting objectionable content based on elements contained in the at least one content item.

18. The non-transitory computer readable medium of claim 13, wherein metadata associated with the at least one content item is received with the receiving of the at least one content item.

19. The non-transitory computer readable medium of claim 18, wherein the filtering includes rejecting objectionable content based on elements contained in the at least one content item, and wherein the elements include parts of the metadata associated with the at least one content item.

* * * * *